United States Patent
Nandakumaran et al.

(10) Patent No.: US 12,506,684 B2
(45) Date of Patent: Dec. 23, 2025

(54) LINK DOWN EVENT MANAGEMENT WITH LOGICAL PATH REMAPPING

(71) Applicant: Arista Networks, Inc., Santa Clara, CA (US)

(72) Inventors: Purushothaman Nandakumaran, Milpitas, CA (US); Terence King Lam Hui, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/383,408

(22) Filed: Oct. 24, 2023

(65) Prior Publication Data

US 2025/0133012 A1    Apr. 24, 2025

(51) Int. Cl.
*H04L 45/28* (2022.01)
*H04L 45/03* (2022.01)
*H04L 45/12* (2022.01)

(52) U.S. Cl.
CPC .............. *H04L 45/28* (2013.01); *H04L 45/03* (2022.05); *H04L 45/123* (2013.01)

(58) Field of Classification Search
CPC ......... H04L 45/22; H04L 45/38; H04L 45/12; H04L 45/24; H04L 45/54; H04L 69/22; H04L 2101/622; H04L 2212/00; H04L 45/03; H04L 45/28; H04L 45/123; H04L 45/00; H04L 45/70
See application file for complete search history.

(56) References Cited

U.S. PATENT DOCUMENTS

| | | | |
|---|---|---|---|
| 8,787,400 B1* | 7/2014 | Barth | H04L 45/24 370/419 |
| 9,544,185 B1* | 1/2017 | Yadav | H04L 41/0659 |
| 10,044,603 B1* | 8/2018 | Singh | H04L 45/42 |
| 11,818,034 B1 | 11/2023 | Saubhasik et al. | |
| 2005/0073958 A1* | 4/2005 | Atlas | H04L 45/22 370/238 |
| 2010/0027543 A1* | 2/2010 | Rustagi | H04L 45/48 370/392 |
| 2013/0039169 A1* | 2/2013 | Schlansker | H04L 45/28 370/225 |

(Continued)

*Primary Examiner* — Tonia L Dollinger
*Assistant Examiner* — Linh T. Nguyen
(74) *Attorney, Agent, or Firm* — Patent Capital Group

(57) ABSTRACT

A networking device uses multipath routing for paths designated as logical paths having associated physical interfaces, such that link down events are processed by remapping related logical paths to other physical links. The networking device includes a forwarding table that is generated according to a multipath algorithm, such as an equal-cost multipath (ECMP) algorithm. The forwarding table specifies different logical paths mapped to physical links, which may include different physical interfaces and related processing information. Packets are processed by selecting a logical path and applying the mapped profile information and/or physical egress interface of the selected logical path. When a link down monitor detects a link down event, a logical path mapped to the now-unavailable physical link is remapped to another physical link, enabling packets to be selected for the affected logical path and successfully processed before re-calculation of forwarding table to account for the unavailable physical link.

20 Claims, 5 Drawing Sheets

| Forwarding Table 400A ||||| 
|---|---|---|---|---|
| Logical Path | Default Physical Interface | Link Profile Index | Active Link Profile | Mapped Physical Interface |
| LP1 | EP1 | 1 | Dest1_MAC | EP1 |
| LP2 | EP2 | 2 | Dest2_MAC | EP2 |
| LP3 | EP3 | 3 | Dest3_MAC | EP3 |

Detect Link down Event for EP1

| Forwarding Table 400B ||||| 
|---|---|---|---|---|
| Logical Path | Default Physical Interface | Link Profile Index | Active Link Profile | Mapped Physical Interface |
| LP1 | EP1 | 1 | Dest2_MAC | EP2 |
| LP2 | EP2 | 2 | Dest2_MAC | EP2 |
| LP3 | EP3 | 3 | Dest3_MAC | EP3 |

(56) References Cited

U.S. PATENT DOCUMENTS

| | | | |
|---|---|---|---|
| 2014/0247753 A1* | 9/2014 | Koponen | H04L 41/08 |
| | | | 370/255 |
| 2014/0362731 A1* | 12/2014 | Wijnands | H04L 45/50 |
| | | | 370/254 |
| 2015/0372902 A1* | 12/2015 | Giorgetti | H04L 45/22 |
| | | | 370/219 |
| 2016/0014015 A1* | 1/2016 | Mangin | H04L 45/745 |
| | | | 370/218 |
| 2017/0054630 A1* | 2/2017 | Liang | H04L 45/64 |
| 2017/0187614 A1* | 6/2017 | Haramaty | H04L 45/74 |
| 2018/0077051 A1* | 3/2018 | Nainar | H04L 45/745 |
| 2018/0109446 A1* | 4/2018 | Srinivasan | H04L 45/28 |
| 2018/0212881 A1* | 7/2018 | White | H04L 43/20 |
| 2021/0160173 A1* | 5/2021 | Biradar | H04L 43/0841 |
| 2021/0234727 A1* | 7/2021 | Ranpise | H04L 63/0272 |
| 2022/0311702 A1* | 9/2022 | Yallouz | H04L 45/28 |

\* cited by examiner

LINK DOWN EVENT MANAGEMENT WITH LOGICAL PATH REMAPPING

BACKGROUND

This disclosure relates generally to multipath data networking and more particularly to reducing data loss when a link down event occurs.

In multipath routing, such as equal-cost multipath (ECMP) routing, dataflows to a particular destination address may be sent through multiple different paths to split overall traffic to a destination through different intermediate networking devices. From the perspective of an individual networking device, the different paths may be implemented as different next hops (e.g., with different egress interfaces and/or different next-hop networking devices) for sending packets to the destination address. For a particular destination address (or a group of addresses sharing the same routes), a forwarding table stores the route to the destination address as multiple paths (i.e., next-hop destinations) for sending the packets. The forwarding table may thus specify the egress interface and information for formatting a packet for the next hop (e.g., to address the packet to the next device's MAC address). Packets may be quickly and automatically forwarded based on the information in the forwarding table by selecting a next hop in the forwarding table. Paths may be selected based on different path selection algorithms, such as based on a hash of packet information or on a round-robin basis. The automatic processing at this level may be referred to as the "forwarding plane" as it automatically applies the stored information in the forwarding table to perform packet processing.

However, when a physical link goes down or otherwise becomes unavailable, data routed to the physical link may be dropped, such that automatic routing with the forwarding table to the unavailable link results in dropped packets. This is typically corrected by re-calculating the forwarding tables with the applicable routing algorithm, but can result in delays and lost packets while the existing forwarding tables continue to be used by the forwarding plane until the calculations to update it is completed. In the time between the link being identified as unavailable and the forwarding table is updated to account for the unavailable link, packets may continue to be routed by the forwarding plane to the unavailable links, resulting in packet loss.

Figure 1:
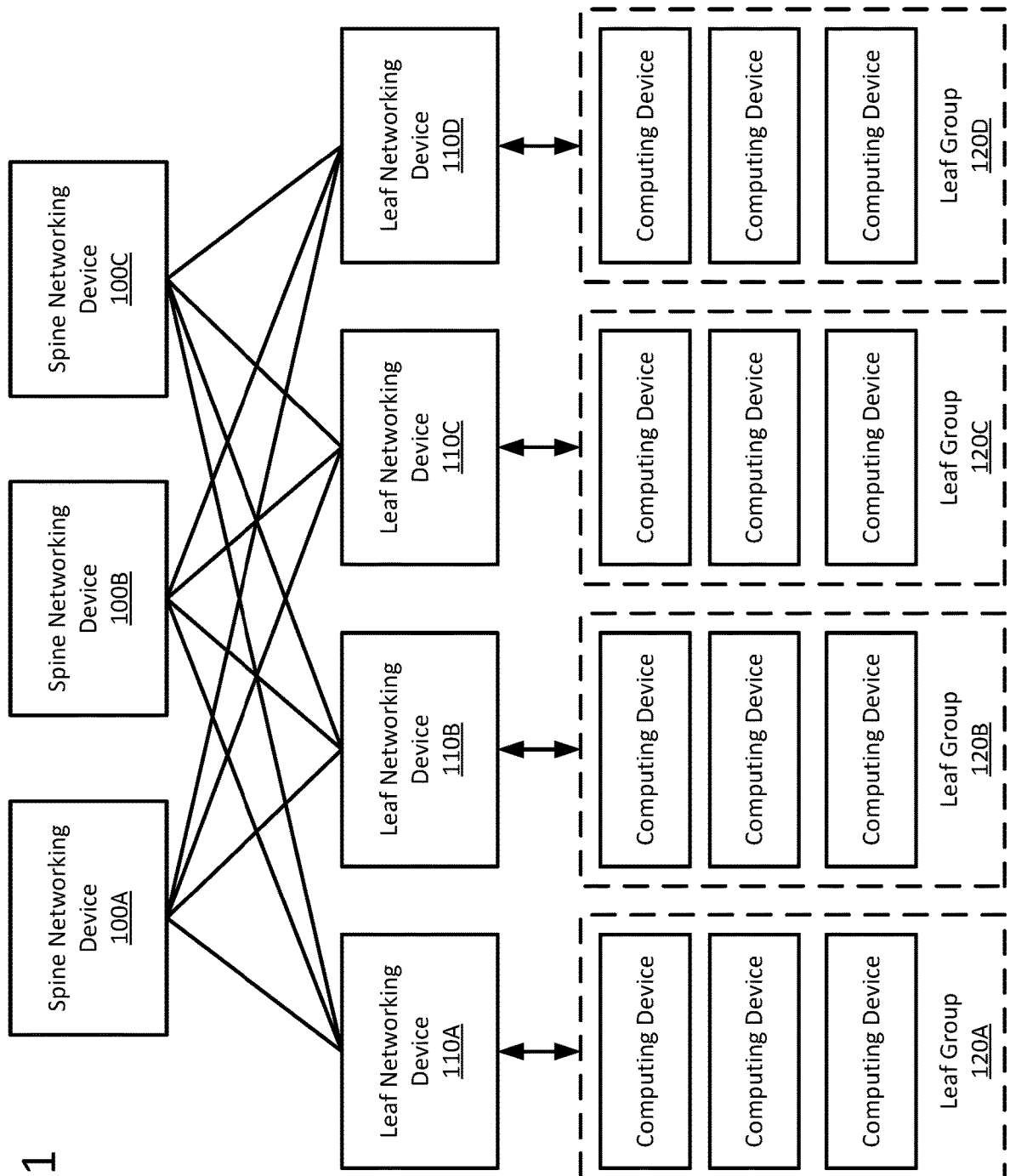
FIG. 1 shows an example environment in which networking devices transfer information between devices, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Rather than directly define packet processing in the forwarding table according to physical links (e.g., packets transmitted on a particular egress interface to be received and processed by a subsequent device), a networking device selects a logical path from a forwarding table having a set of logical paths corresponding to a multipath routing. Each of the logical paths may have an associated physical link describing parameters for sending the packet to the subsequent networking device for processing (e.g., a "next hop" that may perform its own switching/routing of packets). A logical path in some instances may be defined as a "logical port" such that the forwarding tables are stored with respect to logical port numbers for a particular destination. In some embodiments the forwarding table specifies a group of logical ports (or more generally, logical paths) for a destination, and one or more additional tables map the logical ports to physical interfaces (e.g., physical ports) and related handling characteristics as discussed below. Traffic for a destination address (e.g., an IP address) is split according to the logical paths and then sent with the physical interface mapped to that logical path. Each physical link may also have an associated profile describing additional characteristics for processing associated packets. The physical link may thus describe an egress interface for the packet and may include a "profile" of characteristics to be applied to the packet and its processing, such as setting the destination MAC address of the next networking device to receive the packet. As such, one or more tables map the logical path to a physical interface along with a corresponding profile, such as a MAC address, to be applied to the packet for handling to the nexthop device when selected for the logical path. In one embodiment, a forwarding table is used to determine a logical path (e.g., a logical port), and a nexthop table maps the selected logical path to an egress interface and an applicable MAC address (and/or other handling characteristics) to be applied to the packet.

To reduce packet loss when a link down event occurs, when the associated physical link for a logical path goes down, the logical path may be remapped to another physical link (of another logical path to the destination), enabling the forwarding table to continue to be used to split traffic to different logical paths without packet loss. The logical paths are associated with physical links that initially correspond to physical interfaces (and associated profile information) as determined by the multipath routing algorithm to the destination. The logical ports can then be remapped to another physical port if a physical link becomes unavailable. Thus, the existing forwarding table can continue to be used (selecting a logical port as before) while mapping the logical ports to the available physical links. When a physical link goes down, the forwarding tables that use that physical link are then updated to remap the associated logical port (in the respective forwarding tables) to another available physical interface. Packets may then be delivered immediately via the remapped physical links with the existing logical port configuration, reducing packet loss between the time that a link goes down and re-calculation of the forwarding table. Said another way, the packets can be re-routed at the forwarding plane before control plane updates of the forwarding tables.

The forwarding table may also include (or reference) certain profiles and configuration information that follows the logical path or physical link. For example, in addition to changing the egress interface for associated packets, associated packet information may also need to be modified to correspond to the modified physical link, for example by changing the destination MAC address of the packet. In addition, the physical link remapping may also affect traffic prioritization and memory buffer management for the affected physical interfaces, and settings may similarly be updated for other packet processing characteristics to properly account for linecards and other physical subconfigurations.

System Environment

FIG. (FIG. 1 shows an example environment in which networking devices transfer information between devices, according to one embodiment. In the environment of FIG. 1, the networking devices are configured in a spine and leaf architecture including a group of spine networking devices 100A-C and leaf networking devices 110A-D. The networking devices and related processes discussed herein may also be applied to different networking configurations and architectures, such that the particular arrangement shown in FIG. 1 shows one example architecture in which these approaches may be applied. In general, the networking devices, such as spine networking devices 100A-C and leaf networking devices 110A-D, provide various network switching and routing services between various computing devices and may provide networking services with L2 and/or L3 network addressing (e.g., including handling with Media Access Control (MAC) and Internet Protocol (IP) addresses).

In the architecture of FIG. 1, computing devices may be organized into a number of leaf groups, shown here as four leaf groups 120A-D. In general, in this architecture, the computing devices in each leaf group 120A-D are connected to a respective leaf networking device 110A-D, such that computing devices within a particular leaf group 120 may communicate with other computing devices in the same leaf group via the respective leaf networking device 110 associated with that group. For example, leaf group 120A may be connected to one or more leaf networking device(s) 110A that provides communication between the computing devices of leaf group 120A and also provides for communication to other leaf networking devices 110B-D (and respective leaf groups 120B-D) through the spine networking devices 100A-C. Each of the leaf networking devices 110A-D may be connected to each of the spine networking devices 100A-C, such that, each group of leaf networking devices 110A-D may communicate to any of the other leaf networking devices through several of (in this configuration, any/all of) the spine networking devices 100A-C. The different computing devices may communicate with packets including a payload for delivery and header information describing various information for handling processing of the packet during network communication, which may include information about the source, destination, sequence information, priority information, data type, and so forth.

As one example implementation, this spine and leaf architecture may be used for communication by rack-mounted servers as the computing devices, such that each server in a particular rack may be grouped as an individual leaf group that communicates with an associated leaf networking device 110. Communication within a rack may thus be handled directly by that particular leaf networking device 110 and communication to servers on another rack (belonging to another leaf group) is processed through a "spine" including a number of spine networking devices 100.

Many such architectures (among others) may use multipath packet routing, such that multiple paths may be used between a given source and destination address to distribute the communication load along different devices and communication channels. As such, different individual flows between a particular source and destination device may be routed along different paths. One algorithm for routing with multiple paths is equal-cost multipath (ECMP) routing, in which a cost is determined for each of the multiple paths to a destination, and paths having the same cost (or substantially-similar cost) are determined as available paths for sending packets between a source and destination that together form the "route" to the destination. For example, a computing device in leaf group 120B with a destination computing device in leaf group 120D may send its packets to one of the leaf networking devices 110B, which may have multiple paths to route the packets through the spine networking devices 100A-C to reach the destination computing device via the leaf networking devices 110D. In further examples, such architectures may include multiple leaf networking devices 110 for each of the leaf groups 120, along with intermediate routers, switches, and other networking devices. As such, while FIG. 1 provides one example architecture, further configurations may include various different architectures, networking devices, and so forth.

When the routing costs and multiple paths to a destination are determined, from the perspective of individual networking devices, the paths may be distilled to entries in a forwarding table for quickly processing packets based on the forwarding table with minimal processing. The packets may be processed by a particular networking device by selecting one of the paths according to a selection algorithm that may preserve the same path for similar dataflows, for example, by hashing information about the packets to apply the same path to packets having the same information (e.g., based on a source IP, port, or MAC address). Connections between spine and leaf nodes may become unavailable for various reasons. For example, a physical connection between them may fail or a networking device may be removed from the configuration. Such events are termed a "link down event." As discussed in the following figures, the networking devices maintain information for the forwarding tables with respect to logical paths, such that the selected paths for packet flows are determined with respect to logical paths rather than directly selecting among the physical links. Each of the logical paths has an associated physical link to a "next hop" networking device. The next hop networking device is a subsequent device that performs independent processing/switching of packets on the route from an origin computing device to destination computing device. For example, in FIG. 1, the leaf networking device 110A may process a packet from a computing device from leaf group 120A for delivery to a computing device in leaf group 120C, such that packets may be sent to spine networking device 100C as the next hop from the leaf networking device 110A. Additional logical paths may include physical links to the other spine networking devices 100A, 100B.

When a link down event occurs, the logical paths associated with that link are remapped to other physical links, such that the logical path may continue to be used for maintaining packet flow according to the path selection algorithm (e.g., a hashing algorithm). When one of the logical paths is selected for a packet, the remapped physical link, which is now associated with the selected logical path, is used for processing the packet. This enables the same logical path to result in use of a different physical link when the logical path is remapped. As one example, the leaf networking device 110A may have three logical paths to a leaf networking device 110C via respective mapped physical links to each of the spine networking devices 100A-C. If the connection to spine networking device 100C becomes unavailable, the associated logical path may be remapped to physical links associated with spine networking device 100A or 100B, enabling the multipath data flow to continue to use the three logical paths (originally corresponding to physical links to spine networking devices 100A-C) with a reduced number of physical links (now without a physical link to spine networking device 100C). That is, remapping the logical path previously associated with the physical link to spine networking device 100C permits the logical path to successfully process packets with the remapped physical link. Although subsequent routing processes may re-calculate multipath routing for the forwarding table based on the reduced number of active/available physical links, remapping the logical path in the interim prevents selection of that logical path from sending packets to the unavailable physical link.

As such, although the following discussion generally relates to the perspective of networking devices in a spine and leaf architecture, and particularly from the perspective of a leaf networking device 110 (e.g., having multipath routing through several spine networking devices 100A-C), the networking devices and related processes discussed herein apply to other configurations of multipath routing and networking device architectures.

Networking Device

Figure 2:
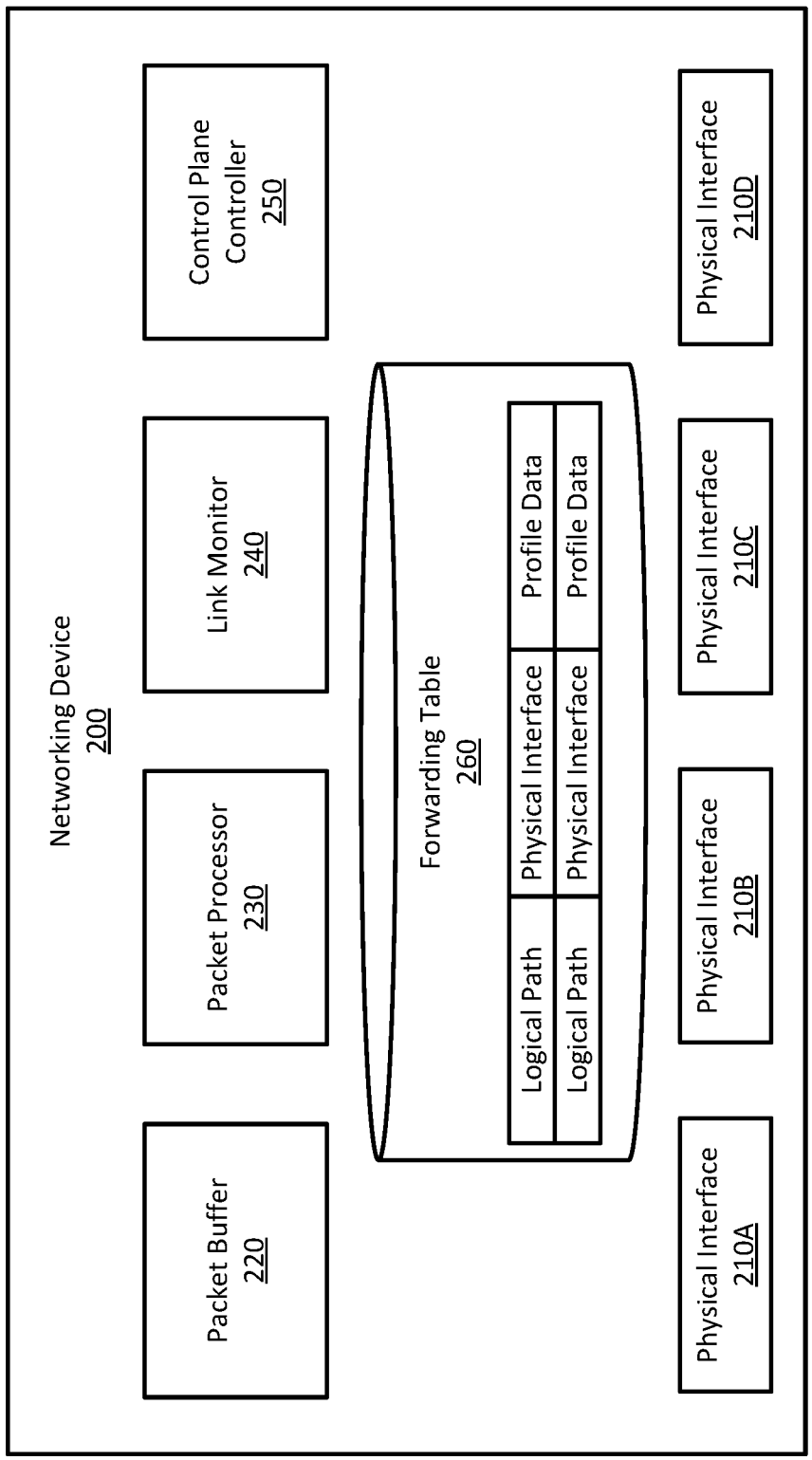
FIG. 2 shows example components of a networking device, according to one embodiment.

FIG. 2 shows example components of a networking device 200, according to one embodiment. The networking device 200 may be implementations of the networking devices shown in FIG. 1, such as the spine networking devices 100A-C and leaf networking devices 110A-D. The various components shown in FIG. 2 are generally discussed with respect to their functional behavior, such that various implementations may separate the discussed functionality into additional components or further combine the functionality to fewer components than discussed herein. In addition, in many instances, the discussed components are implemented in hardware circuits, registers, memories, processing circuits, and so forth, and thus may include application-specific circuits, programmable circuits, as well as general-purpose processors (that operate on instructions in a memory such as a non-transitory computer-readable medium) for performing the discussed functions.

The networking device 200 includes a number of physical interfaces 210A-D for receiving and sending packets. Packets received at a physical interface 210 may be stored at the packet buffer 220 for processing and routing determinations and egress at one of the physical interfaces 210, which is typically a different physical interface 210 than the physical interface at which the packet was received. In some embodiments, received packets may also be filtered, at the physical interface 210A-D or by another component (such as a packet processor 230), for example, to retain packets that are addressed to the networking device 200 and discard packets that are not addressed to the networking device 200. This filtering may be based, for example, on hardware-level addresses such as a Media Access Control (MAC) address associated with the networking device 200 or its physical interfaces 210A-D.

A packet processor 230 inspects the packets and determines a physical interface 210A-D for sending each packet to a subsequent networking device (i.e., a "next hop" device). In addition to determining the particular physical interface 210A-D to which the packet is to be sent, the packet processor 230 may also modify a packet's headers to modify addressing of the packet and apply other information that may be used by subsequent devices to process the packet. As one example, the MAC address in the packet header may be modified to rewrite the destination MAC address in the packet from the MAC address of the networking device 200 to a MAC address of the subsequent device for the packet in the network. After processing, the packet may be sent to the designated physical interface 210, which sends the packet along the corresponding physical connection for receipt by the subsequent networking device. Though not shown here, the networking device 200 may include further buffers and queues for managing the packets at different stages, such as before processing by the packet processor 230, a queue for transmission by each physical interface 210, and so forth.

The packet processor 230 processes each packet according to information in a forwarding table 260. The forwarding table 260 provides information for selecting a physical interface for egress of packets based on characteristics of the packet. The forwarding table 260 includes information for multiple logical paths for forwarding the packet, such that packets to a particular destination address may be distributed to different logical paths and sent along the different paths for delivery to the destination address. In some embodiments, the same set of logical paths may be used for more than one destination address. For example, in the environment shown in FIG. 1, the leaf networking device 110A may use the same set of logical paths (i.e., the same entries in the forwarding table) for all destination addresses belonging to leaf group 120C (e.g., that may all be routed through any of the spine networking devices 100A-C and subsequently leaf networking device 110C). As such, the forwarding table may include multiple logical paths corresponding to one or more destination addresses; similarly, different forwarding tables (or entries in a single forwarding table) may be used for different groups of destination addresses.

Each logical path in the forwarding table 260 may be associated with a physical link describing the particular combination of characteristics for sending a packet to the subsequent networking device on a path toward reaching the packet's final destination. The physical link may include a particular physical interface 210 for egressing the packet from networking device 200, along with one or more additional characteristics for further processing the packet and/or signaling information about its transmission. These additional characteristics may also be referred to as "profile" data that may be applied by the packet processor 230. The profile data for a physical link is shown here as stored in the forwarding table 260 for convenience; as discussed further below, the particular components of the packet processor 230 and forwarding table 260 may be configured as discrete components. In some embodiments, different logical paths and/or destination addresses may use the same link profile data. For example, for leaf networking device 110B, a destination address in leaf group 120C and a destination address in leaf group 120D may each have separate groups of logical paths having different entries in the forwarding table 260, but may each include a logical path corresponding to a physical link to spine networking device 100C, such that the same physical egress ports and profile information may be applied to packets (for either of the destination addresses) using the physical link to spine networking device 100C.

The packet processor 230 thus selects a logical path and associated physical link, coordinates application of profile information for the physical link, and provides the processed packet to be transmitted via the physical interface 210 corresponding to the physical link to the next hop destination. Additional information about the packet processor 230 and forwarding table 260 are discussed with respect to FIGS. 3-4.

A link monitor 240 monitors performance of the physical interfaces 210A-D and successful transmission of packets from the respective physical interfaces 210A-D. The link monitor 240 determines whether physical links to subsequent networking devices are active or have become inactive. A physical link may become inactive due to a physical connection problem (e.g., a physical wire no longer successfully carries a packet) because a connected networking device is nonresponsive or disconnected, or for other reasons. The link monitor 240 thus identifies "link down events" indicating that a previously active physical link to another networking device is no longer operable. This may be determined in a variety of ways, such as the lack of expected acknowledgement, control signals that are not responded to, signaling from the subsequent device, and so forth. When a link down event occurs, the link monitor 240 accesses the forwarding table 260 to remap logical paths that use the now-unavailable physical link to other available physical links. As such, the same logical paths may be used for packet path selection after the link down event without blackholing packets (i.e., sending packets to paths that do not proceed to the destination) and without requiring the forwarding table 260 to be re-calculated. As such, the use of path selection according to logical paths and the capability to remap logical paths thereby enables continued delivery of packets before updates to the forwarding table 260 that may account for the downed link. In addition, as the logical path may be remapped in the forwarding table 260, the remapped physical link may be applied quickly at the forwarding plane as the packet processor 230 continues to process packets according to the updated mapping in the forwarding table 260. Examples of remapping the physical link for a forwarding table are further discussed with respect to FIGS. 4-5.

The networking device 200 also includes a control plane controller 250 that coordinates control of the networking device 200, such as updates to the forwarding table 260. The control plane controller 250 may perform and implement additional types of control for the networking device 200 in addition to managing the forwarding table 260. In general, the control plane controller 250 organizes and determines operation of the forwarding plane of the networking device 200, determining the various parameters for operating the packet processing of the networking device 200. As such, the control plane controller 250 may perform various route-finding tasks, and in some embodiments, may coordinate with controllers at other networking devices to determine and implement routes to destination addresses.

The control plane controller 250 specifies the paths in the forwarding table 260 for a particular destination address (or a group of destination addresses sharing the same set of paths) based on a multipath routing algorithm. In general, the control plane controller 250 determines the available physical links (e.g., egress interfaces and related characteristics for the other networking devices directly reachable via the physical interfaces 210 of the networking device 200) and may determine a cost to reach the destination address via each of the available physical links. Based on the costs, some of the links may be used as the physical links for reaching the destination address in the forwarding table 260. In some embodiments, the multipath routing algorithm is an ECMP routing algorithm, such that the selected links for a destination address have the same cost from the networking device 200, such that each physical link is expected to have the same cost for reaching the destination (e.g., in time, number of hops, etc.). Each of the physical links may be defined as a particular combination of characteristics describing discrete paths for reaching a subsequent networking device. For example, the physical link may describe transmitting the packet from physical interface 210B for receipt by a destination device having a specific MAC address, such that the transmission via physical interface 210B of a packet having that destination MAC address is received by that destination device for further routing to subsequent devices.

In some embodiments, the multipath routing algorithm is operated in conjunction with information coordinated with other networking devices, for example to remove loops, redundant links, and so forth. From the perspective of each networking device, one or more spanning trees may be developed to determine routes to the destination addresses (that may be shared by a group of destination addresses having the same routing), such that the networking device represents a root of the spanning tree and different physical links represent initial links used in different spanning trees for reaching destination addresses. Alternate spanning trees may be developed and evaluated, such that the different physical links used for routing to a particular destination address represent alternative spanning trees for the address. By determining spanning trees (e.g., in conjunction with control and signaling with other networking devices) represented by each of the physical links maintained in the forwarding table, each selected physical link may then be configured to prevent loops and effectively "forward" travel of the packets to the destination. Thus, when the physical links are stored as logical paths in the forwarding table and a subsequent link down event subsequently remaps a physical link, this may be considered to transition the messaging for that logical path to an alternate spanning tree.

When a link down event occurs, remapping the logical path enables continued operation of packet forwarding at the forwarding plane and reduces packet loss at the forwarding plane. However, the routing optimizations and packet distribution may be affected by the increased load of the physical link(s) that now receive the remapped packets, such that the control plane controller 250 may subsequently re-calculate routes for the forwarding tables 260 with the physical links that are then currently available. In some cases, the physical link may become inactive or unavailable and then become available again due to a temporary interruption. As such, in some cases, the control plane controller 250 may wait a threshold amount of time before re-calculating forwarding tables 260 and does not re-calculate the forwarding tables 260 in response to the link down event if the physical link becomes available again.

As such, the control plane controller 250 may execute the multipath routing algorithm according to the available physical links and based on the costs to reach a destination address. Once the relevant physical links are selected, the physical links may be associated with logical paths for the forwarding table 260. Thus, while the physical links are used to generate/update the forwarding table 260 for a particular destination address (or group of addresses), the physical links are stored in association with logical paths that are used by the packet processor 230 for routing packets. In some embodiments, the control plane controller 250 may also specify a path selection algorithm (or its parameters) for selecting a path when using the forwarding table 260. The path selection algorithm is used by the packet processor 230 for selecting which of the logical paths may be used for a particular packet. The particular path selection algorithm may thus affect the relative frequency or rate that a particular logical path (and its mapped physical link) is used for transmitting packets to a destination.

The path selection algorithm may be a round-robin algorithm that selects each logical path at an equal frequency, for example, such that for N paths, each path is selected for 1/N packets. In another example, the path selection algorithm may generally aim to keep packets for the same dataflows along the same routes, such that the packets associated with the same flow are more likely to arrive in-order at the destination as the packets for the same flow travel along the same route. To do so, the path selection algorithm may use characteristics of a packet to determine the logical path, for example, by combining relevant characteristics and hashing the result among the logical paths. In one embodiment, the path selection algorithm may hash network addressing information such as the source address and destination address (e.g., IP addresses and, optionally, respective IP port information). When a packet is received by the packet processor 230, the packet's header is inspected to determine the relevant characteristics that are then hashed according to the logical paths. Packets having the same addressing characteristics (e.g., source IP address/port and destination IP address/port) may thus be hashed to the same logical path, enabling the "flow" of individual packets that each specify a particular source address/port to a particular destination address/port to be hashed to the same logical path. When a link down event occurs, because the path selection algorithm determines a logical path, after remapping to another physical link, these packets may continue to be routed to the same physical link together, allowing the "flow" of packets to continue to maintain in-order delivery along the remapped physical link.

As such, when a link down event occurs for one of the physical links and is detected by the link monitor 240, the associated logical path may then be remapped to another physical link for continued operation with the previously-determined logical paths. Because the affected logical path(s) is remapped, the logical paths may continue to be selected and deliver packets with the remapped physical links. As such, packets may be successfully routed to the "logical path" before a re-calculation of the forwarding table 260 that accounts for the reduced number of physical links. The control plane controller 250 may subsequently update the forwarding table 260 according to the currently-available physical links, and any delay in updating the forwarding table does not result in lost packets due to selection of unavailable physical links at the forwarding table.

Packet Processing

Figure 3:
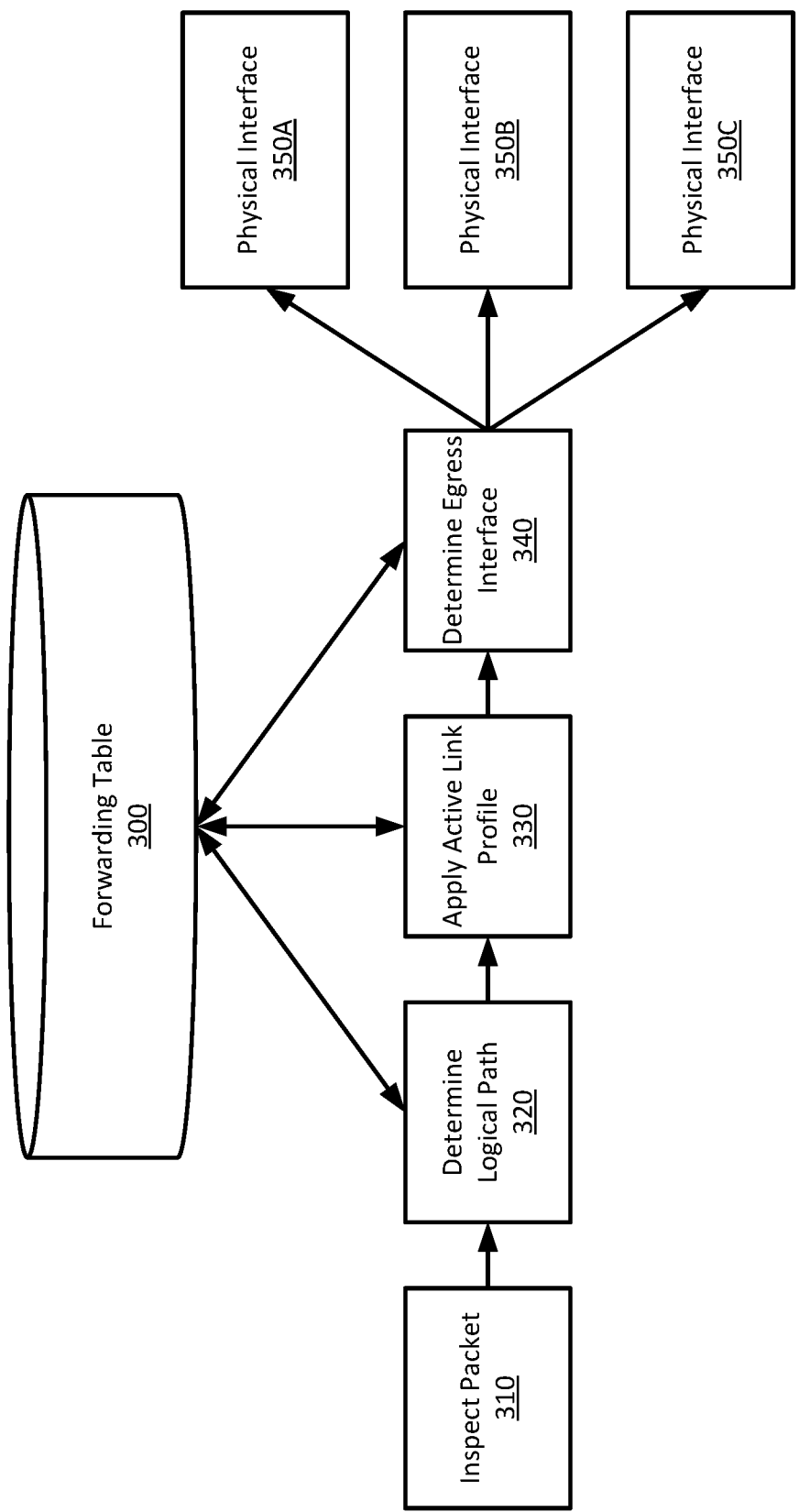
FIG. 3 shows an example flow of packet processing in the forwarding plane, according to one embodiment.

FIG. 3 shows an example flow of packet processing in the forwarding plane, according to one embodiment. FIG. 3 shows an example of packet processing that may be performed, for example, by the packet processor 230 of FIG. 2. Although shown in FIG. 2 as one component, in different embodiments, the packet processor and information of the forwarding table 300 may be performed by discrete processing circuits or data storage elements. Similarly, though one buffer is shown in FIG. 2, in various embodiments the networking device 200 may include a number of specialized buffers and packet queues for different stages of the packet processing, and may include an ingress buffer, processing buffer, egress buffers, and so forth. As such, each of the processing steps discussed herein may be performed by processing circuits operating on data storage elements and/or packet buffers for each respective step, such that the processing and packet handling may be pipelined in hardware in the forwarding plane to maximize throughput.

As discussed above, when a packet is sent to an interface, it may be stored in a buffer for processing. To begin processing, the packet processor inspects 310 the packet to determine characteristics of the packet relevant for routing the packet, such as the header information indicating source information, destination information, and other characteristics that may affect its handling.

Using the destination address, the packet processor identifies the relevant information in the forwarding table 300, including the logical paths that may be used for packets based on the destination address for the packet. Next, the logical path for the packet is determined 320 by applying the respective path selection algorithm, which may be based on information in the packet header, such as the source and destination IP address and port. As discussed above, the logical path selection may be determined to provide the same path for packets of the same "flow" and may be determined directly by inspecting the packets or inferred from the header information, such as a combination of source/destination information.

Using the selected logical path, information about the currently-mapped physical link is applied to 330 any relevant packet handling profiles and to identify 340 the egress interface to which the packet will be sent. The packet handling profile, as also discussed above, may include any required parameters and characteristics to apply to the packet itself as well as additional signaling or configurations for handling the packet and for successful transmission to the subsequent networking device. Stated another way, the profile specifies the relevant parameters for sending the packet to the subsequent node (e.g., in the spanning tree) with the mapped physical link. As one example, the profile may specify a hardware address (e.g., a MAC address) of the subsequent networking device, and applying the active link profile 330 includes rewriting the destination hardware address in the packet, such that the subsequent networking device will recognize and accept the packet. Additional information in the packet header may also be rewritten or modified in various configurations. In some embodiments, the networking device may be configured with several linecards or other physical subcomponents that perform additional packet handling, such that the physical interfaces exiting the networking device are on the various linecards (or other similar physical subcomponents). In these configurations, the link profile may specify various tags or subtags that indicate how the linecard is to handle the packet. In these configurations, it may be the respective linecard that performs further packet handling and/or header modification for transmission to the next networking device. The physical link profile may include additional packet handling information such as a priority for the packet, a traffic class, and so forth that may be affected by the particular physical link used by the packet. After identifying and applying 330 respective physical link profile information, the egress interface for the physical link of the logical path is determined 340 by looking up the respective entry for the logical path and the packet is sent to the respective physical interface(s) 350A-C (or a respective buffer) for egress to the next networking device. As such, rather than the path selection algorithm directly selecting a physical link, the packet processor determines a logical path and applies the respective handling for the mapped physical link, such as its link profile and egress port.

Forwarding Table

Figure 4:
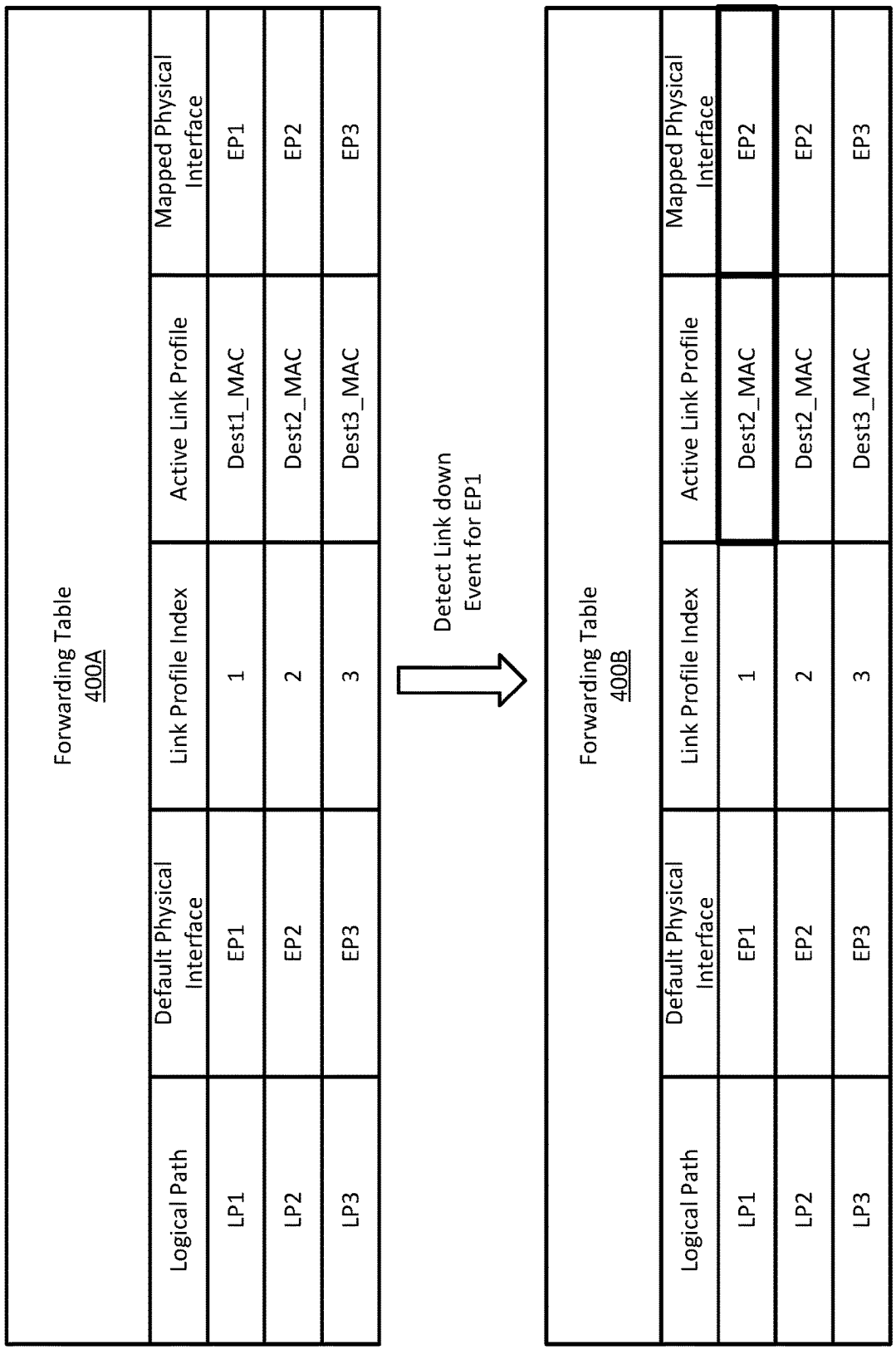
FIG. 4 shows one example forwarding table and an updated forwarding table responsive to a link down event, according to one embodiment.

FIG. 4 shows one example forwarding table 400A and an updated forwarding table 400B responsive to a link down event, according to one embodiment. In various embodiments, a forwarding table 400 may include additional or fewer fields than shown in FIG. 4. In general, the forwarding table 400 includes a number of logical paths, shown here as LP1-LP3; and information relating to the currently-mapped values of the paths, or a reference to the appropriate values to be updated if the physical link for a logical path, is modified. For example, in one embodiment, information for modifying a packet header to specify a destination hardware address (in the example of FIG. 4, a destination MAC address) may be stored in a separate hardware memory than the mapped interface at which the packet is sent for egress of the networking device, such that separate processing components access the different hardware memories.

In the example of FIG. 4, a forwarding table 400A is generated for one or more destination addresses specifying the logical paths LP1-LP3 corresponding to the physical links that were selected by the multipath routing algorithm. The forwarding table 400A in this example specifies the physical interface that was used in the routing algorithm, indicated as a "Default Physical Interface" designating three egress ports EP1-EP3. In addition, in this example, a link profile index may designate an index in a memory that holds the characteristics to be applied when the respective logical path is selected. The active link profiles specify the characteristics to be applied in processing the packet for a particular physical link used by the logical path. In this example, the link profiles specify the MAC address of the destination networking device (e.g., the next hop device to receive the packet), indicated here as Dest1_MAC to Dest3_MAC. Similarly, the physical interface for egress of a packet for a particular logical path is designated as the "Mapped Physical Interface." In the forwarding table 400A, which may represent a state of the forwarding table after a multipath routing algorithm is applied and before any subsequent link down events, the mapped physical interface EP1-3 corresponds to the default physical interface EP1-3, and the destination MAC addresses similarly correspond to the MAC addresses of the subsequent networking devices accessible by egress for the mapped physical interfaces. For example, packets formatted to specify a destination hardware address of Dest2_MAC and sent via the physical interface EP2 are received and further processed by a destination networking device corresponding to Dest2_MAC.

When a link down event is detected, the forwarding table 400A may be updated as indicated in forwarding table 400B. In this example, the link down event is detected with respect to the physical link corresponding to the default physical interface for EP1. To update the forwarding table, the logical paths that use the affected physical link are identified. In this example, the logical path LP1 uses the mapped physical interface for EP1, which was affected by the link down event, such that this logical path LP1 is affected by the link down event. To enable continued delivery of packets, the logical paths identified as affected by the link down event (here, LP1) should be remapped to an active physical link.

In this example, two other physical links are available, corresponding to destination MAC addresses Dest2_MAC to Dest3_MAC and physical interfaces EP2 and EP3. A register (not shown) may store the status of each physical link and indicates whether the physical link is available or unavailable (i.e., active or inactive) for transmitting packets. This register may be referenced for determining the alternative link for remapping the affected logical path to an active physical link. Alternatively, the affected logical path may use the physical link for another logical path that has a mapped physical interface matching the default physical interface (i.e., the other logical path has not been remapped). The appropriate values for logical path 1 are remapped as shown in forwarding table 400B to designate an active link profile and mapped physical interface for the remapped physical link. In this example, the active link profile is remapped to the MAC address of Dest2_MAC and the mapped physical interface is changed to EP2, such that the physical link used by logical path LP2 is now also used by LP1.

When relevant information for processing packets of a logical path is stored in additional memories or registers, these are also modified to reflect the updated physical link. In this example, the applied profile information for logical path 1 is stored at link profile index 1, such that this corresponding link profile is updated for the remapped physical link. That is, when the packet processor accesses link profile index 1, the retrieved value now designates the active link profile for the remapped physical link, in this case, the MAC address for Dest2_MAC. In various embodiments and configurations, respective additional types of memories and profile information may be similarly updated according to the particular configuration of the networking device. By storing path information in the forwarding table in this way and selecting routing for packets according to the logical paths, the respective physical links can be remapped "in place," enabling continuing service when links become unavailable.

In many cases, the same physical link may be used for many different addresses (e.g., in different multipath groups of logical paths), such that the forwarding table entries for many groups of logical paths are updated to different physical links. As such, while shown in FIG. 4 as one forwarding table that may correspond to one set of multipath entries for one destination address (or a set of addresses sharing the same multipath configuration), additional sets of multipath entries corresponding to different multipath entries for different destination addresses may also be used. Different sets of logical paths may include the same physical link, such that when a physical link becomes unavailable, all of the logical path groups including the physical link are identified and the affected logical path (of each group) is updated with an alternate physical link selected from that multipath group.

As such, the affected logical path in different multipath groups may be remapped to different physical links. For example, physical links A, B, and C may be used in a first multipath group designating logical paths LP1-3 and physical links B, C, D, and E may be used in a second multipath group designated as logical paths LP1-4 in that group. In this example, the first multipath group is used for routing to a first group of destination addresses while the second multipath group is used for routing to a second group of destination addresses. When physical link C becomes unavailable, corresponding logical path 3 (LP3) in the first multipath group may be remapped to physical link A or B, while corresponding logical path 2 in the second multipath group is remapped to physical link B, D, or E. As such, the unavailable physical link C may affect routing to groups of destination addresses, but each multipath group may use a different alternative physical link. In some embodiments, the alternate physical links selected to remap the logical paths are further optimized to reduce the frequency that the same physical link is used as an alternative in different multipath groups. In the example just discussed, the remapping may thus avoid remapping physical link B for the affected logical path in both the first multipath group and also in the second multipath group.

Link Down Events

Figure 5:
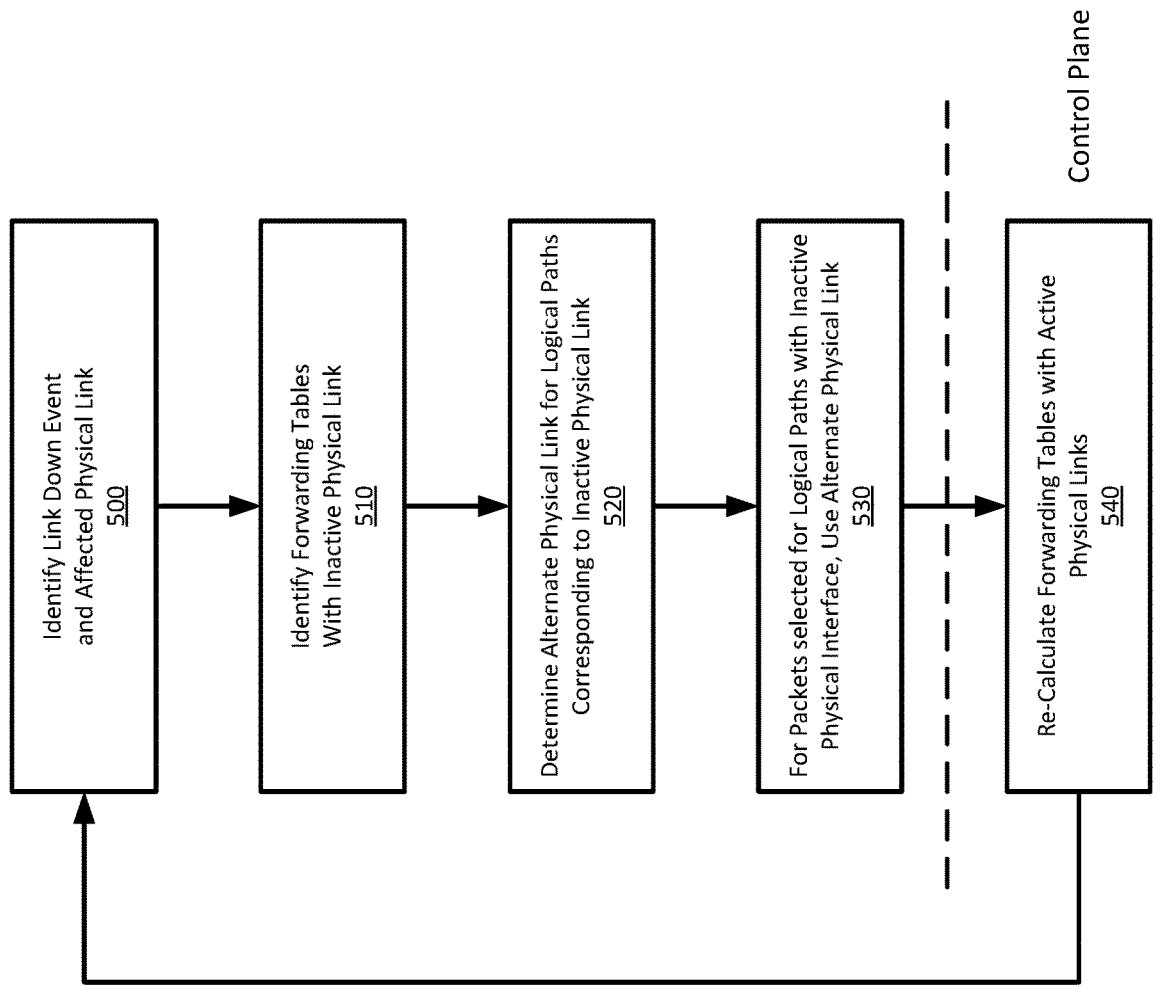
FIG. 5 shows an example process for handling a link down event with physical link remapping, according to one embodiment.

FIG. 5 shows an example process for handling a link down event with physical link remapping, according to one embodiment. Before the process of FIG. 5, a set of multipath routes may be established to a destination and reflected in a forwarding table as discussed above, such that received packets may be routed according to the forwarding table. A link down event is identified 500 and the affected physical link is identified, indicating for example that the physical link from a networking device to a destination device is no longer successfully transferring packets to the subsequent networking device for further processing. The link down event may be detected as discussed above, for example based on lacking acknowledgement, control signals, or other information.

After detecting the link down event and determining which physical link is affected, the forwarding table(s) (e.g., the multipath groups) that are mapped to the affected physical link are identified 510, for example, by looking up the mapped physical links in the forwarding table. For each of the affected logical paths corresponding to the inactive physical link (i.e., that was affected by the link down event), an alternate physical link is determined 520 based on the physical links of the other logical paths to the same destination address (e.g., the logical paths in the same multipath group). The logical path is then remapped, such that when packets are received and the path selection algorithm determines that the packet should use the logical path corresponding to the inactive link, the packets instead are sent to the alternate remapped physical link. This may be performed by updating values in the forwarding table as discussed above. As an alternative, when a logical path is selected for a packet, the status of the corresponding physical link may be identified at that time; when the physical link is designated inactive, then an alternate physical link for another logical path in the multipath group is used.

As also discussed above, these processes may be applied automatically at the forwarding plane, enabling continued packet delivery with the forwarding table with a remapped physical link.

By using 530 the alternate physical link, the previous logical paths may continue to be used and thus encourage particular dataflows previously delivered by the affected physical link to be switched to the remapped physical link with the same logical path and thus be expected to continue to be delivered in-order at the destination.

At a subsequent point, the forwarding tables may be re-calculated 540 with the active physical links, enabling re-evaluation of the routing based on the now-available links. This re-calculation is typically performed at the control plane and may require signaling with other networking devices, cost calculations, and so forth, that may require a meaningful amount of time. By remapping the physical links at the forwarding plane as discussed, packets may continue to be successfully routed with respect to the logical paths and between the link down event and control plan re-calculation 540.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for handling a link down event in a networking device, comprising:
   identifying a link down event wherein an unavailable physical link is associated with a first physical interface of the networking device;
   identifying, from a forwarding table of the networking device, a logical path from a plurality of logical paths to a destination address, wherein each of the plurality of logical paths is mapped to one of a plurality of physical interfaces of the networking device, and further wherein the first logical path is mapped to the first physical interface;

after identifying the link down event, modifying the forwarding table to remap the first logical path in the forwarding table to an alternate physical interface in the plurality of physical interfaces that is mapped to a second logical path of the plurality of logical paths in the forwarding table; and processing a packet for the destination address for delivery via the first logical path and the second logical path by egressing the packet via the alternate physical interface.

2. The method of claim 1, further comprising updating the forwarding table with a routing algorithm based on a plurality of available physical interfaces in the plurality of physical interfaces, wherein the forwarding table is updated subsequent to processing the packet for the destination address via the alternate physical interface.

3. The method of claim 1, wherein the plurality of logical paths have an equal cost to reach the destination address.

4. The method of claim 1, further comprising determining the packet is for delivery via the first logical path with a path selection algorithm that selects from the plurality of logical paths.

5. The method of claim 4, wherein the path selection algorithm comprises a hash or a round-robin algorithm.

6. The method of claim 1, wherein processing the packet includes applying a profile associated with an alternate next hop device accessible via the alternate physical interface.

7. The method of claim 6, wherein the profile includes a MAC address of the alternate next hop device.

8. A networking device for handling link down events in multipath routing in the forwarding plane, comprising:
  a plurality of physical interfaces for receiving packets from and transmitting packets to other networking devices;
  a forwarding table designating a plurality of logical paths to a destination address, each logical path of the plurality of logical paths mapped to a physical interface of a plurality of physical interfaces;
  a packet processor configured to process packets by selecting a logical path for egress from the plurality of logical paths in the forwarding table according to a path selection algorithm and sending packets to the mapped physical interface of the selected logical path; and
  a link monitor configured to identify a logical path affected by a link down event and to modify the forwarding table to map another physical interface of the plurality of physical interfaces to the identified logical path;
  such that packets selected for egress via the identified logical path and packets selected for egress via another logical path of the plurality of logical paths are sent to the other physical interface before the forwarding table to the destination address is re-calculated.

9. The networking device of claim 8, wherein the plurality of logical paths of the forwarding table are calculated based on an equal-cost multipath (ECMP) routing algorithm.

10. The networking device of claim 8, wherein the path selection algorithm is based on a hash of packet information or a round-robin algorithm.

11. The networking device of claim 8, wherein the packet processor is further configured to process a packet by modifying a packet based on a profile associated with the logical path and the link monitor is further configured to modify the profile for the identified logical path affected by the link down event based on the other physical interface.

12. The networking device of claim 11, wherein the profile is a next-hop MAC address.

13. The networking device of claim 11, wherein the profile is a tag or subtag applied to the packet.

14. The networking device of claim 8, wherein the network device further includes a plurality of linecards, and wherein the plurality of physical interfaces are on the plurality of linecards.

15. A non-transitory computer-readable medium storage having instructions encoded thereon that, when executed by a processor, cause the processor to:
  identify a link down event wherein an unavailable physical link is associated with a first physical interface of a networking device;
  identify, from a forwarding table of the networking device, a logical path from a plurality of logical paths to a destination address, wherein each of the plurality of logical paths is mapped to one of a plurality of physical interfaces of the networking device, and further wherein the first logical path is mapped to the first physical interface;
  after identifying the link down event, modifying the forwarding table to remap the first logical path in the forwarding table to an alternate physical interface in the plurality of physical interfaces that is mapped to a second logical path of the plurality of logical paths in the forwarding table; and
  process a packet for the destination address for delivery via the first logical path and the second logical path by egressing the packet via the alternate physical interface.

16. The non-transitory computer-readable medium of claim 15, wherein the instructions further cause the processor to remap the first logical path to the alternate physical interface in the forwarding table.

17. The non-transitory computer-readable medium of claim 15, wherein the plurality of logical paths have an equal cost to reach the destination address.

18. The non-transitory computer-readable medium of claim 15, wherein the instructions further cause the processor to determine the packet is for delivery via the first logical path with a path selection algorithm that selects from the plurality of logical paths.

19. The non-transitory computer-readable medium of claim 18, wherein the path selection algorithm comprises a hash or a round-robin algorithm.

20. The non-transitory computer-readable medium of claim 15, wherein processing the packet includes applying a profile associated with an alternate next hop device accessible via the alternate physical interface.

* * * * *